United States Patent Office 3,381,061
Patented Apr. 30, 1968

3,381,061
PENTAERYTHRITOL PHOSPHORUS DIISO-
CYANATES AND PROCESS FOR PRE-
PARING SAME
Rudi F. W. Rätz and Philip M. Pivawer, Hamden, Conn., assignors to Olin Mathieson Chemical Corporation, New Haven, Conn., a corporation of Virginia
No Drawing. Filed July 27, 1965, Ser. No. 475,252
4 Claims. (Cl. 260—927)

ABSTRACT OF THE DISCLOSURE 3,9 - diisocyanato - 2,4,8,10-tetraoxa-3,9-diphosphaspiro [5.5]undecane-3,9-dioxide is provided in high yield and purity by reaction of 3,9-dichloro-2,4,8,10-tetraoxa-3,9-diphosphaspiro[5.5]undecane with an alkali metal cyanate under selected conditions to provide the corresponding diisocyanate which is then oxidized under selected conditions to provide the -3,9-dioxide. The compound is used to prepare both flexible and rigid urethane polymers.

---

This invention relates to bifunctional phosphorus containing isocyanates. More specifically it relates to the preparation of pentaerythritol phosphorus diisocyanates especially the compound having the formula:

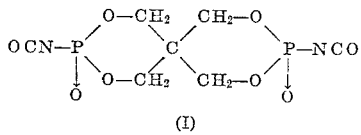

(I)

The correct chemical name for the above compound in accordance with Chemical Abstracts usage is 3,9-diisocyanato - 2,4,8,10 - tetraoxa-3,9-diphosphaspiro[5.5]undecane-3,9-dioxide.

The preparation of the corresponding pentaerythritol phosphorus diisothiocyanate has been described in U.S. Patent 3,090,800 wherein 3,9-dichloro-2,4,8,10-tetraoxa-3,9-diphosphaspiro[5.5]undecane-3,9-dioxide was reacted with an alkali metal thiocyanate. However, all previous attempts to prepare the diisocyanate I have heretofore been unsuccessful although a variety of synthetic approaches have been employed.

For example, the direct reaction of 3,9-dichloro-2,4,8, 10 - tetraoxa - 3,9-diphosphaspiro[5.5]undecane-3,9-dioxide with alkali metal cyanates in dimethylacetamide, liquid sulfur dioxide and similar solvents failed to provide the diisocyanate I even in trace amounts. Similar negative results were obtained even when the generally successful reactant silver cyanate was utilized. The reaction of pentaerythritol and phosphorus pentachloride followed by treatment of the bis trichlorophosphorane intermediate with an alkyl urethane did not provide the expected diisocyanate I since the intermediate suffered rearrangement to an open chain derivative during the attempted preparation. The attempted phosgenation of 3,9-diamino-2,4,8,10 - tetraoxa-3,9-diphosphaspiro[5.5]undecane-3,9-dioxide (M.P. 297°–300° C. from water) by conventional procedures did not provide any of the desired diisocyanate, and the diamine was essentially recovered. Likewise, reaction of the 3,9-diamino-2,4,8,10-tetraoxa-3,9-diphosphaspiro[5.5]undecane-3,9-dioxide with oxalyl chloride failed to yield any of the desired compound I. Several additional more complicated synthetic approaches have been unsuccessfully employed in an effort to obtain the diisocyanate.

Therefore the principal object of this invention is to provide pentaerythritol phosphorus diisocyanates. A more particular object of this invention is to provide the heretofore unknown diisocyanate I. Still another object of this invention is to provide a simple and efficient process for the preparation of the aforementioned spiro diisocyanate.

These objects have been accomplished in accordance with this invention. It has now been found that 3,9-dichloro - 2,4,8,10 - tetraoxa-3,9-diphosphaspiro[5.5]undecane reacts with an alkali metal cyanate in a selected solvent system to provide the corresponding diisocyanate which is then oxidized by use of sulfur trioxide to provide the diisocyanate I in high yield and good purity. Sulfur trioxide is known to be a very strong oxidizing agent, and it is a surprising and unexpected feature of this invention that the spirane system is not cleaved under the rigorous oxidizing conditions.

Thus, the first reaction in the process disclosed herein for the preparation of the diisocyanate I involves the reaction of the cyanates with the undecane in a liquid sulfur dioxide medium. The selection of this solvent is particularly advantageous, since it is one of a very limited number of solvents which is suitable for bringing the organic derivative into intimate contact with the inorganic cyanate wherein high yields of 3,9-diisocyanato-2,4,8,10-tetraoxa-3,9-diphosphaspiro[5.5]undecane are provided. Any of the available alkali metal cyanates including cesium and rubidium cyanates may be utilized in this reaction, but generally it is preferred to employ the sodium, potassium and lithium cyanates. Upon completion of this reaction, the formed alkali metal chloride can be separated from the reaction system before the subsequent oxidation is performed, but the preferred process embodiment for the preparation of I does not contemplate this procedure. It has been found that sulfur trioxide can instead be immediately added to the reaction mixture containing the 3,9-diisocyanato-2,4,8,10-tetraoxa-3,9-diphosphaspiro[5.5]undecane and the inorganic chloride wherein the desired oxidation and consequent formation of the compound I proceeds in almost quantitative yield. The oxidizing agent may be added in concentrated form to the reaction mixture, or conveniently added in liquid sulfur dioxide solution. Thus, in order to obtain the diisocyanate I by the preferred process embodiment, it is necessary to employ liquid sulfur dioxide as a solvent since it is uniquely suitable for use in both the displacement and oxidation reactions. Using this solvent, no isolation of the intermediate 3,9-diisocyanato-2,4,8,10-tetraoxa-3,9-diphosphaspiro[5.5]undecane is required, and there is no necessity for solvent removal except after the oxidized product I is formed. Upon completion of the oxidation step, the formed alkali metal chloride is conveniently removed by filtration, centrifugation or like procedures to provide a sulfur dioxide solution of the desired product. Final isolation is achieved by removing the solvent to yield the solid crystalline product.

Both the displacement and oxidation reactions can be carried out in liquid sulfur dioxide medium at a temperature range of about —50° C. to about +50° C. However, sulfur dioxide boils about —10° C., and since the preferred process is performed at atmospheric pressure, a temperature of —10° C. or less must be employed in this process. Higher reaction temperatures (i.e., above —10° C.) may be employed, but pressure equipment is then required.

As noted in the foregoing discussion, the intermediate 3,9 - diisocyanato - 2,4,8,10 - tetraoxa-3,9-diphosphaspiro- [5.5]undecane may itself be isolated after the displacement reaction. However, this derivative does not have the hydrolytic stability exhibited by the -3,9-dioxide I. The intermediate, however, can be converted to the corresponding 3,9-disulfide by adding it to a carbon disulfide solution of flower of sulfur. The yield of the latter disulfide does not approach the essentially quantitative yield of the compound I obtained as previously described.

The pentaerythritol phosphorus diisocyanates disclosed herein are useful materials in the preparation of both flexible and rigid urethane polymers. It has been found that in particular 3,9-diisocyanato-2,4,8,10-tetraoxa-3,9-diphosphaspiro[5.5]undecane - 3,9 - dioxide is useful for reaction with polyhydroxy compounds, commonly referred to as polyols, to provide urethanes having enhanced resistance to deterioration by flame. When the diisocyanate I is used in place of the previously known 3,9-diisothiocyanato - 2,4,8,10 - tetraoxa-3,9-diphosphaspiro-[5.5]undecane-3,9-dioxide in the preparation of various urethane polymers, a much improved process for polymer formation is provided since the NCO derivative reacts with the polyols at a substantially faster rate than the NCS derivative. Furthermore, the urethanes prepared using the diisocyanate I are superior in several important properties to the urethanes provided from the corresponding diisothiocyanate. For instance, flame proofing properties are significantly better in the urethanes prepared from polyols and the compound I, and this is attributed to the replacement of the divalent sulfur which is a readily oxidizable moiety and thus particularly susceptible to deterioration by flame. Also flexible foams prepared by using the diisothiocyanate reactants have on occasion exhibited an undesirable odor which severely limits their use in many of the obvious applications of flexible foams, and this odor problem has not been encountered in flexible foams provided from polyols and the diisocyanate I.

The following example is illustrative of the preparation of the diisocyanate I.

Example 1

In a 500 ml. round-bottom, three necked flask fitted with a pressure equalized dropping funnel and a Dry Ice condenser which in turn was fitted with a calcium sulfate drying tube was placed 26.5 g. (0.1 mole) of 3,9-dichloro-2,4,8,10-tetraoxa-3,9-diphosphaspiro[5.5]undecane and 15.6 g. (0.22 mole) of sodium cyanate. Sulfur dioxide (300 ml.) was condensed in the flask, and the mixture was refluxed for 28 hours at −10° C. Then 5.6 ml. (0.2 mole) of sulfur trioxide in 75 ml. of sulfur dioxide was added slowly over a ½ hour period at −10° C. The reaction mixture was stirred for an additional ½ hour and then filtered in a nitrogen atmosphere to remove the inorganic salt residue. This solid residue was then washed with 100 ml. of sulfur dioxide, and this wash material was added to the previous filtrate. The sulfur dioxide filtrate was then evaporated to provide 30.0 g. of a white crystalline material, melting at 190°–192° C. with decomposition. Efforts to recrystallize this material were unsuccessful. The following analytical data revealed that 3,9 - diisocyanato - 2,4,8,10 - tetraoxa-3,9-diphosphaspiro[5.5]undecane-3,9-dioxide had been obtained. Yield: 96%.

Analysis.—Calcd. for $C_7H_8N_2P_2O_8$: C, 27.10; H, 2.58; N, 9.03; P, 20.00. Found: C, 26.27; H, 2.65; N, 9.19; P, 19.3.

An infrared spectrum showed strong bands at 4.3μ (NCO) and 7.6μ (P=O) thus confirming the structure to be the desired diisocyanate I.

What is claimed is:

1. 3,9 - diisocyanato - 2,4,8,10 - tetraoxa - 3,9 - diphosphaspiro[5.5]undecane-3,9-dioxide.

2. A process for preparing 3,9-diisocyanato-2,4,8,10-tetraoxa - 3,9 - diphosphaspiro[5.5]undecane-3,9-dioxide which comprises reacting 3,9-diisocyanato-2,4,8,10-tetraoxa-3,9-diphosphaspiro[5.5]undecane with sulfur trioxide in a liquid sulfur dioxide medium at a temperature range of about −50° C. to about +50° C., and removing said sulfur dioxide from the reaction mixture to provide said -3,9-dioxide.

3. The process of claim 2 which is performed at atmospheric pressure at a temperature range of about −50° C. to about −10° C.

4. An integral process for preparing 3,9-diisocyanato-2,4,8,10 - tetraoxa-3,9-diphosphaspiro[5.5]undecane-3,9-dioxide which comprises reacting 3,9-dichloro-2,4,8,10-tetraoxa-3,9-diphosphaspiro[5.5]undecane with an alkali metal cyanate in a liquid sulfur dioxide medium, adding sulfur trioxide to the resulting reaction mixture, said reactions with said cyanate and said trioxide being performed at a temperature range of about −50° C. to about +50° C., separating formed alkali metal chloride from the reaction mixture and isolating the desired 3,9-diisocyanato - 2,4,8,10 - tetraoxa-3,9-diphosphaspiro[5.5]-undecane-3,9-dioxide.

References Cited

UNITED STATES PATENTS

| | | | |
|---|---|---|---|
| 2,059,084 | 10/1936 | Buchheim | 260—985 |
| 3,090,800 | 5/1963 | Ratz | 260—927 |

CHARLES B. PARKER, *Primary Examiner.*

A. H. SUTTO, *Assistant Examiner.*